United States Patent [19]

McIntyre

[11] 3,812,716
[45] May 28, 1974

[54] POSITIVE CONTACT ROTARY THERMOCOUPLE UNIT

[76] Inventor: Edwin L. McIntyre, 700 W. A St., Dixon, Calif. 95620

[22] Filed: May 11, 1972

[21] Appl. No.: 252,191

[52] U.S. Cl................. 73/341, 73/351, 99/342, 136/235, 339/5 RL
[51] Int. Cl..... G01k 13/08, G01k 7/04, H01r 39/43
[58] Field of Search.......... 73/340, 341, 343 R, 351, 73/352; 99/342, 361; 136/221, 230, 235; 339/5 A, 5 M, 5 S, 5 R, 5 RL, 8 A, 8 R, 8 RL

[56] References Cited
UNITED STATES PATENTS

| | | | |
|---|---|---|---|
| 696,191 | 3/1902 | Powell | 339/5 R X |
| 1,449,246 | 3/1923 | Rarig | 99/361 |
| 2,436,949 | 3/1948 | Anderson | 339/8 R |
| 2,774,898 | 12/1956 | LeTourneau | 339/8 R |
| 3,218,595 | 11/1965 | Motsinger | 339/5 M |
| 3,316,519 | 4/1967 | Matone | 339/5 M |
| 3,362,213 | 1/1968 | Van Deven et al. | 73/351 X |
| 3,383,918 | 5/1968 | Cumbers et al. | 73/351 |
| 3,534,610 | 10/1970 | Pruden | 73/351 X |

Primary Examiner—Richard C. Queisser
Assistant Examiner—Frederick Shoon
Attorney, Agent, or Firm—Clarence A. O'Brien & Harvey B. Jacobson

[57] ABSTRACT

A rotary contact thermocouple assembly for heat penetration measurements of foods prepared by rotary cookers. The thermocouple assembly comprises a rotor core of insulation material which supports a pair of thermocouple contact terminals connected to a pair of conductive slip rings which coact with a pair of spring-biased brushes, whereby positive contact is maintained at all times over a relatively large temperature range.

9 Claims, 6 Drawing Figures

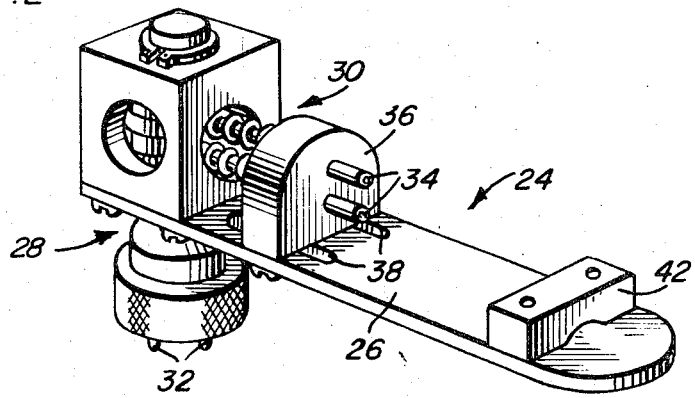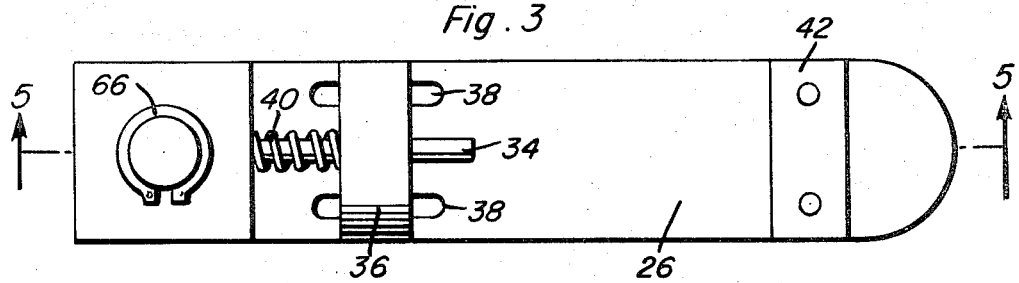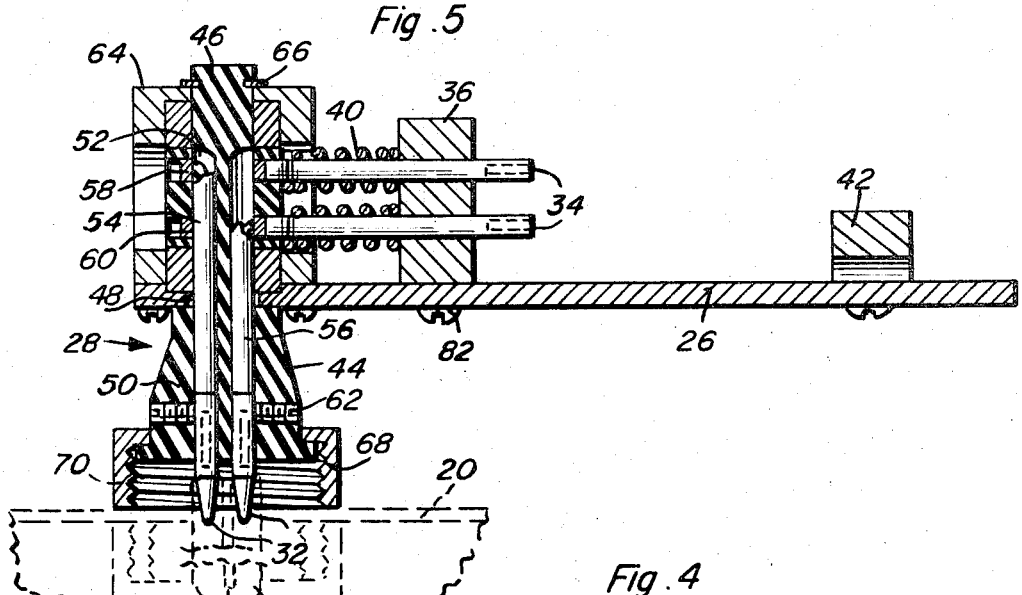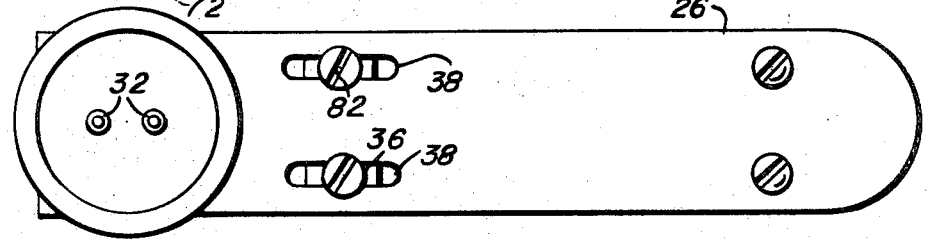

POSITIVE CONTACT ROTARY THERMOCOUPLE UNIT

The present invention is generally related to thermocouples and, more particularly, to an improved rotary thermocouple assembly used for the purposes of recording heat penetration temperature measurements of rotary cooking processes.

In recent years, it has become common practice of the canned food industry to provide heat penetration evaluations of their cooking processes in order to assure against inadequate cooking of food products which could present serious health problems to consumers. Most such evaluations have been made with rotary cookers which carry several cans of food, each provided with a thermocouple to provide electrical signals to a temperature recording apparatus. As the cooker revolves, the thermocouples are caused to rotate with the associated cans. It is necessary to provide a contact means for transferring the currents of the rotating thermocouple to the stationary recording apparatus. In the past, this has been done by way of rotary thermocouple heads which were highly susceptible to expansion and contraction due to temperature changes during the cooking processes. Such conventional constructions often presented a loss of contact or open circuit condition, whereby discontinuities existed in the temperature readings. The occurrence of such discontinuities required time-consuming retesting in order to obtain the desired temperature data.

Therefore, it is an object of the present invention to provide an improved rotary thermocouple assembly which assures positive contact at all times over the entire cooking temperature range, whereby time-consuming retesting of cooking processes is eliminated.

Another object of the present invention is to provide a unique rotary thermocouple contact device including an insulated rotor core which supports a pair of contact tips and associated slip rings which remain in wiping engagement with a pair of brush elements throughout the entire cooking temperature range.

It is a further object of the present invention to provide a versatile positive contact rotary thermocouple assembly which includes a relatively small number of moving parts, is reliable, durable, long lasting, yet relatively inexpensive to manufacture and maintain.

These together with other objects and advantages which will become subsequently apparent reside in the details of construction and operation as more fully hereinafter described and claimed, reference being had to the accompanying drawings, forming a part hereof, wherein like numerals refer to like parts throughout.

FIG. 2 is a perspective view of the rotary thermocouple assembly of the present invention.

FIG. 3 is a plan view of the assembly shown in FIG 1.

FIG. 4 is a bottom view of the rotary contact device shown in FIG. 2.

FIG. 5 is a sectional view taken along section 5—5 of FIG. 3 with a phantom view of a typical food container lid and thermocouple.

Figure 1:
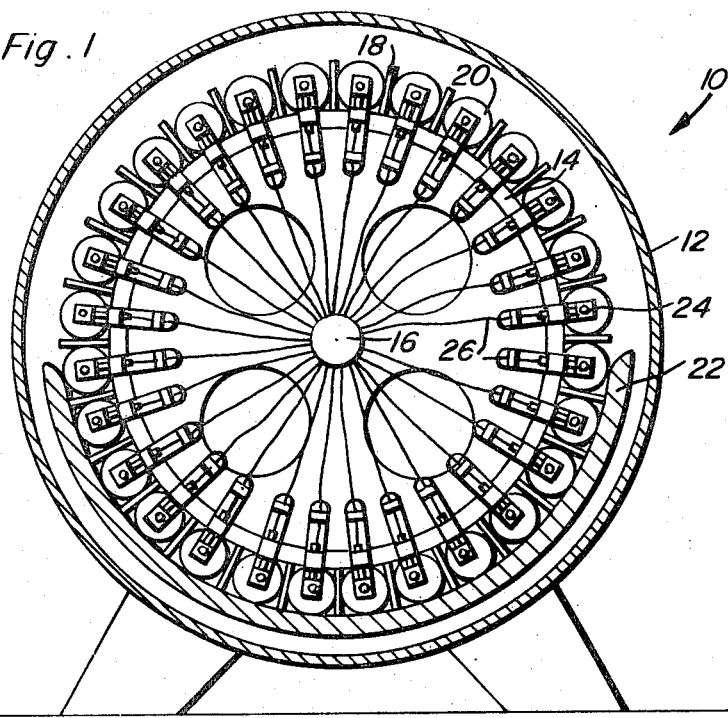
FIG. 1 is a simplified sectional view of a typical rotary cooker utilizing the rotary thermocouple assemblies of the present invention.

Referring now, more particularly, to FIG. 1 of the drawings a typical rotary cooker associated with the present invention is generally indicated by the numeral 10 and includes a cylindrical housing 12 surrounding a rotatable drum 14 supported by a shaft 16. The drum includes a plurality of circumferentially spaced partitions 18 which define compartments for embracing food containers or cans 20. As the drum is rotated about the axis of shaft 16, the cans engage an arcuately shaped rim 22, whereby rotation is imparted to the cans about their own axes during the cooking process.

As mentioned above, the purpose of the rotary cooker, so far as it is related to the present invention, is to provide temperature measurements, recordings, and evaluation of the food temperatures during the cooking process. This is achieved by way of rotary thermocouple assemblies 24 mounted to the drum for rotation therewith and circumferentially spaced in a manner to accommodate each of the food cans or containers. Electrical leads 26 extending from each thermocouple assembly are connected to conventional collector rings carried by shaft 16 for connection to a suitable recording apparatus, not illustrated, by way of electrical brushes or the like. Thus, it will be appreciated that as the cooker drum is rotated, the food temperatures within each can are continuously monitored for later study and evaluation.

Referring more particularly to FIGS. 2–4, the positive contact rotary device of the present invention is generally indicated by the numeral 24 and includes a rigid, elongated mounting bracket 26 which rotatably supports a rotor assembly 28 and a stationary brush assembly, generally indicated by the numeral 30. The rotor assembly is provided with a pair of contact tips or terminals 32 which are adapted to engage a thermocouple mounted in an associated food container, such as those illustrated in FIG. 1. Currents from the thermocouple are fed through terminals 32 to a pair of brushes 34 by way of slip rings, as hereinafter explained. The brushes pass through holes in a support member 36, which is adjustably fastened to bracket 26 by way of a pair of elongated slots 38. Brushes 34 are biased into engagement with the slip rings by way of coil compression springs 40, or similar means. The electrical leads 26 illustrated in FIG. 1 are attached to the ends of brushes 34 and are dressed through a guide block 42, which is fastened to bracket 26 by way of screws, or similar means.

Figure 6:
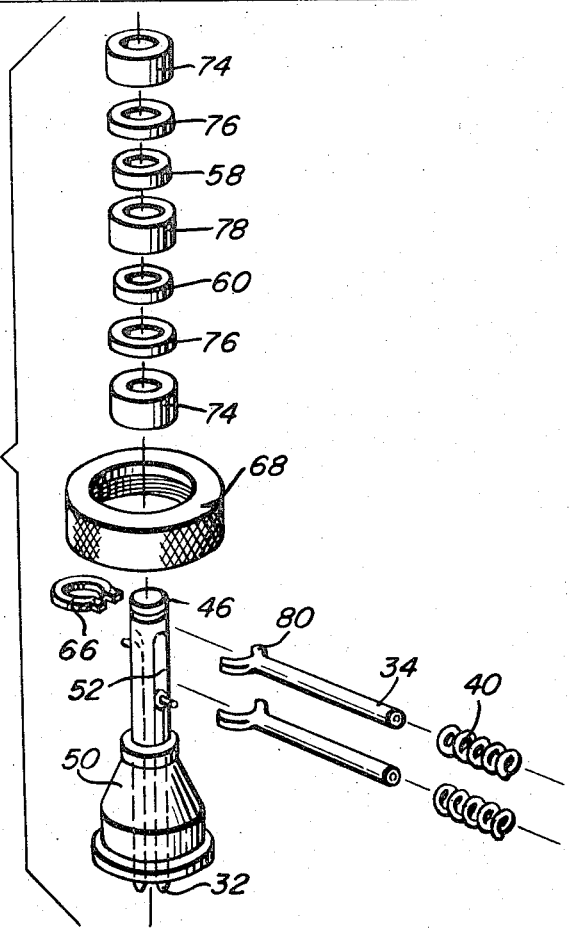
FIG. 6 is an exploded perspective view of the rotor and brush assemblies associated with the present invention.

Referring now, more particularly, to FIGS. 5 and 6 of the drawings, the detailed structure of the rotor and brush assemblies may be more fully appreciated. It will be observed that the rotor assembly 28 includes a rotor core 44 formed from well known electrical insulation materials, such as melamine, and including a generally cylindrical shaft portion 46 which passes through a mounting hole 48 in bracket 26 and is integral with a generally conical portion 50 of greater diameter. The shaft portion is provided with a pair of oppositely disposed, longitudinal grooves or slots 52 which accommodate a pair of insulated conductors 54 and 56 which are connected to conductive annular slip rings 58 and 60, respectively. Conical portion 50 of the rotor core is provided with a pair of spaced, longitudinally extending bores which are coextensive with grooves 52 and accommodate conductors 54 and 56 and contact terminals 32 connected thereto. Preferably, the contact tips are held firmly in place by way of a pair of setscrews 62 threaded into appropriate mounting holes in the rotor core. The rotor assembly is supported by way of a generally cubical housing 64 fastened to bracket 26, the rotor core being held against axial movement by way of a split retaining ring 66 and the shoulder of conical portion 50.

The rotor assembly is provided with a threaded mounting ring or cap 68 which fastens to a corresponding threaded neck 70, illustrated in phantom in FIG. 5 and associated with one of the cooking cans. A conventional thermocouple, indicated in phantom at 72, extends into the interior of the cooking can and has opposite terminals in engagement with terminals 32 to provide currents thereto which are representative of the temperatures being measured. It will be appreciated that as the food container or can 20 rotates, such rotation is transmitted to the rotor assembly through mounting cap 68. Preferably, the respective sides of the thermocouple are made from copper and constantan with the associated contact terminals 32 being made of the same materials to eliminate the creation of unintended secondary thermocouples and assure accurate temperature readings.

The rotor core is supported in housing 64 by way of a pair of annular bearings or bushings 74, preferably, of stainless steel or similar materials. The bushings are insulated from the slip rings by way of a pair of annular insulation members or washers 76 mounted on the core for rotation therewith. The slip rings are axially spaced from each other by way of an insulation collar 78, also mounted to the core.

Housing 64 is provided with a circular hole in each side which serves to decrease the overall weight of the rotary contact device and provide easy access to the slip rings for maintenance, cleaning and the like. Brushes 34 extend through one of the holes in the housing for engagement with the slip rings. Preferably, each brush is of elongated configuration and extends through the convolutions of the associated coil compression spring and through openings provided in support member 36. Each brush is of conductive material and is provided with an arcuate end portion 80 in wiping engagement with one of the slip rings. In addition, the increased dimension of each arcuate portion defines a seat for one end of the associated coil compression spring. As such, the coil compression springs are interposed between the associated seats and support member 36, whereby sufficient brush pressure may be maintained at all times. It will also be appreciated that the spring pressure may be selectively adjusted by loosening screws 82 associated with support member 36 and sliding the support member along the elongated mounting slots 38 to the desired position.

From the foregoing description, it will be appreciated that the rotary thermocouple assembly of the present invention is of relatively simple, compact construction which includes a minimum number of moving parts, yet assures continuity of electrical contact while monitoring cooking temperatures. The arrangement of the rotor core and the manner in which it accommodates the conductors and contact terminals provides for easy maintenance of the contact tips, slip rings, or other rotor assembly components. In addition, the brush contact pressures may be readily adjusted to the desired setting with a minimum amount of effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a thermocouple for sensing food temperatures in containers carried by a rotary cooker, a rotary electric contact device comprising a mounting bracket adapted to be fastened to the rotary cooker, a rotor assembly having a rotational axis, means rotatably mounting the rotor assembly on said bracket for rotation about said rotational axis, said rotor assembly including (1) an elongated, electrically insulated core, (2) a pair of spaced conductive terminals at one end of said core and being electrically connected to said thermocouple, and (3) a pair of axially spaced conductive slip rings mounted on said rotor core for rotation therewith, each of said slip rings being connected to a different one of said terminals, and a brush assembly including (1) a pair of brushes connected to said bracket for reciprocation in directions generally perpendicular to said rotational axis, and (2) means biasing said brushes into wiping engagement with said conductive slip rings.

2. The structure set forth in claim 1 wherein said rotor assembly includes means fastening said rotor core at one end thereof to the associated food container for rotation therewith.

3. The structure set forth in claim 1 wherein said biasing means includes a pair of coil compression springs each engaging one of said brushes.

4. The structure set forth in claim 1 wherein said mounting bracket includes a mounting hole, said rotor core passing through said mounting hole such that said terminals are located on one side of said mounting hole and said slip rings are located on the opposite side of said mounting hole.

5. The structure set forth in claim 4 wherein said rotor core includes (1) a generally cylindrical shaft portion which carries said slip rings, (2) a pair of oppositely disposed, longitudinal grooves in said shaft portion, and (3) a pair of conductors disposed in said grooves and extending between said terminals and said slip rings to provide electrical signals to said brushes representative of temperatures sensed by said thermocouple.

6. The structure set forth in claim 5 wherein said electrical contact device includes a support member, means fastening said support member to said bracket member for selective adjustment of the spacing of said support member relative to said slip rings, said coil springs being compressibly held between said brushes and said support member.

7. For use with a rotary thermocouple, a contact device comprising a mounting bracket adapted to be carried by a rotary cooker or the like, a rotor assembly rotatably carried by said bracket for rotation relative thereto about an axis, and a brush assembly mounted on said bracket for receiving electrical signals from said rotor assembly, said rotor assembly including (1) a rotor core, (2) a pair of conductive terminals mounted to said core and adapted to be connected to a rotary thermocouple, and (3) a pair of conductive slip rings mounted to said core for rotation therewith, said brush assembly including (1) a pair of conductive brushes in wiping engagement with said slip rings, and (2) selectively adjustable biasing means associated with said bracket for biasing said brushes toward said slip rings, said biasing means including a support member mounted on said bracket and spaced from said slip rings, and spring means interposed between said brushes and said support member for influencing said brushes toward said slip rings, said biasing means including means for selectively adjusting the spacing between said support member and said slip rings, whereby the forces of said spring means are selectively adjusted, said spring means including a pair of coil compression springs pressing againt the associated brushes, each of said brushes extending longitudinally into the associated coil compression spring.

8. The structure set forth in claim 7 wherein said brushes extend longitudinally through the associated coil compression spring and into openings in said support member.

9. The structure set forth in claim 8 wherein each of said brushes includes a seat portion upon which one end of the associated coil spring presses.

* * * * *